US012649683B2

(12) United States Patent
Yoshimoto

(10) Patent No.: US 12,649,683 B2
(45) Date of Patent: Jun. 9, 2026

(54) OPTICAL GLASS, OPTICAL ELEMENT, OPTICAL SYSTEM, INTERCHANGEABLE LENS, AND OPTICAL DEVICE

(71) Applicant: NIKON CORPORATION, Tokyo (JP)

(72) Inventor: Kohei Yoshimoto, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 954 days.

(21) Appl. No.: 17/540,787

(22) Filed: Dec. 2, 2021

(65) Prior Publication Data

US 2022/0162112 A1 May 26, 2022

Related U.S. Application Data

(63) Continuation of application No. PCT/JP2020/022114, filed on Jun. 4, 2020.

(30) Foreign Application Priority Data

Jun. 6, 2019 (JP) .................................. 2019-106096

(51) Int. Cl.
*C03C 3/062* (2006.01)
(52) U.S. Cl.
CPC .................................... *C03C 3/062* (2013.01)
(58) Field of Classification Search
CPC .................................................... C03C 3/062
See application file for complete search history.

(56) References Cited

U.S. PATENT DOCUMENTS

| | | | | |
|---|---|---|---|---|
| 6,128,430 A * | 10/2000 | Chu | ...................... | C03B 37/026 |
| | | | | 65/427 |
| 10,071,931 B2 * | 9/2018 | Mikami | ................... | G02B 3/00 |
| 2008/0248941 A1 * | 10/2008 | Fu | ........................... | C03C 3/155 |
| | | | | 501/50 |
| 2009/0069165 A1 * | 3/2009 | Fu | ........................... | C03C 3/066 |
| | | | | 423/617 |
| 2009/0124481 A1 * | 5/2009 | Fu | ........................... | C03C 3/068 |
| | | | | 501/78 |

FOREIGN PATENT DOCUMENTS

| | | |
|---|---|---|
| JP | 57-38342 A | 3/1982 |
| JP | 2010-111527 A | 5/2010 |
| JP | 2015129058 A * | 7/2015 |

(Continued)

OTHER PUBLICATIONS

JP2015129058A machine translation (Year: 2015).*

(Continued)

*Primary Examiner* — Amber R Orlando
*Assistant Examiner* — Cameron K Miller

(57) ABSTRACT

Provided is an optical glass including: by mol % of a cation, 5% to 20% of a content rate of $Si^{4+}$; 18% to 35% of a content rate of $Al^{3+}$; 15% to 50% of a total content rate of $La^{3+}$, $Y^{3+}$, and $Gd^{3+}$; 2% to 15% of a content rate of $Zr^{4+}$; and 8% to 30% of a content rate of $Ta^{5+}$, wherein a ratio of the content rate of $Al^{3+}$ to a total content rate of $Si^{4+}$ and $Al^{3+}$ ($Al^{3+}/(Si^{4+}+Al^{3+})$) is from 0.5 to 0.85.

29 Claims, 7 Drawing Sheets

(56)     References Cited

FOREIGN PATENT DOCUMENTS

WO     WO2013/081027  A1     6/2013
WO     WO2015/093280  A1     6/2015

OTHER PUBLICATIONS

Japanese Office Action dated Feb. 13, 2024 for Japanese Application No. 2021-524901.
Extended European Search Report dated Jul. 7, 2023 for counterpart European Application No. 20818472.1.
Chinese Office Action dated Nov. 13, 2023 for counterpart Chinese Application No. 202080041562.4.
International Search Report, dated Jul. 28, 2020, in corresponding International Application No. PCT/JP2020/022114 (6 pp.).
Japanese Office Action issued May 7, 2025 for Application No. 2024-078633.

* cited by examiner

OPTICAL GLASS, OPTICAL ELEMENT, OPTICAL SYSTEM, INTERCHANGEABLE LENS, AND OPTICAL DEVICE

CROSS REFERENCE TO RELATED APPLICATIONS

This application is a continuation application, filed under 35 U.S.C. § 111(a), of International Application No. PCT/JP2020/022114, filed Jun. 4, 2020, which claims priority benefit from Japanese Patent Application No. 2019-106096, filed Jun. 6, 2019, the contents of each of which are incorporated herein by reference.

TECHNICAL FIELD

The present invention relates to an optical glass, an optical element, an optical system, an interchangeable lens, and an optical device. The present invention claims priority to Japanese Patent Application No. 2019-106096, filed on Jun. 6, 2019, the contents of which are incorporated by reference herein in its entirety in designated states where the incorporation of documents by reference is approved.

BACKGROUND ART

An optical glass is used in various optical elements and optical devices, and, for example, JP 07-081973 A (PTL 1) discloses a halide glass used from an ultraviolet region to an infrared region. In order to increase a degree of flexibility in design of an optical system used in an optical device, development of an optical glass having a high refractive index has been required.

PTL 1: JP 07-081973 A

SUMMARY

A first aspect according to the present invention is an optical glass including: by mol % of a cation, 5% to 20% of a content rate of $Si^{4+}$; 18% to 35% of a content rate of $Al^{3+}$; 15% to 50% of a total content rate of $La^{3+}$, $Y^{3+}$, and $Gd^{3+}$; 2% to 15% of a content rate of $Zr^{4+}$; and 8% to 30% of a content rate of $Ta^{5+}$, wherein a ratio of the content rate of $Al^{3+}$ to a total content rate of $Si^{4+}$ and $Al^{3+}$ ($Al^{3+}/(Si^{4+}+Al^{3+})$) is from 0.5 to 0.85.

A second aspect according to the present invention is an optical element formed of the optical glass described above.

A third aspect according to the present invention is an optical system using the optical element described above.

A fourth aspect according to the present invention is an interchangeable lens including the optical system described above.

A fifth aspect according to the present invention is an optical device including the optical system described above.

DETAILED DESCRIPTION

Figure 1:
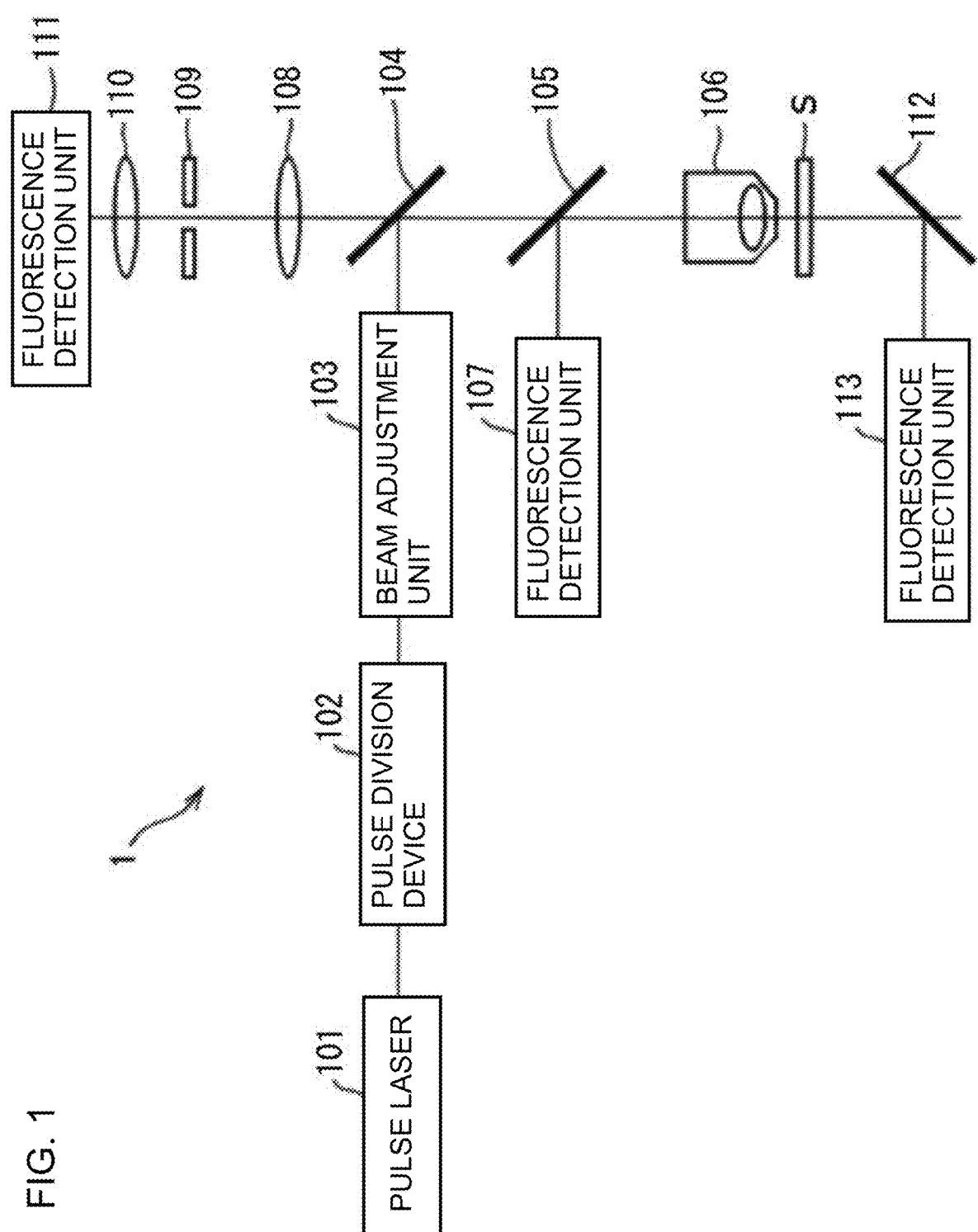
FIG. 1 is a block diagram illustrating an example of a configuration of a multi-photon microscope including an optical element using an optical glass according to the present embodiment.

Hereinafter, description is made on an embodiment of the present invention (hereinafter, referred to as the "present embodiment"). The present embodiment described below is an example for describing the present invention, and is not intended to limit the present invention to the contents described below.

<Optical Glass>

In an optical glass according to the present embodiment, by mol % of a cation, an $Si^{4+}$ component is from 5% to 20%, an $Al^{3+}$ component is from 18% to 35%, the total amount of $La^{3+}$, $Y^{3+}$, and $Gd^{3+}$ components is from 15% to 50%, a $Zr^{4+}$ component is from 2% to 15%, a $Ta^{5+}$ component is from 8% to 30%, and $Al^{3+}/(Si^{4+}+Al^{3+})$ is from 0.5 to 0.85. Note that, in the present specification, a content amount of each component is all expressed by mol % of a cation unless otherwise stated. Further, an aspect of each cation is not particularly limited, but a cation may be contained in an optical glass in a form of an oxide and the like, for example.

The optical glass according to the present embodiment is a new optical glass that can be vitrified even when a content amount of cation constituting a network former oxide such as $SiO_2$ and $B_2O_3$ is low. Then, the optical glass according to the present embodiment can have a high refractive index, low dispersibility (wavelength dependency of a refractive index), and devitrification resistance at a high level. Furthermore, with a composition according to the present embodiment, a large glass gob can be stably manufactured.

First, description is made on each component of the optical glass according to the present embodiment.

An $Si^{4+}$ component is, for example, a component that is included as $SiO_2$ in an oxide-converted composition and constitutes a network former oxide. The $Si^{4+}$ component is a component capable of increasing high fusibility and devitrification resistance. When this content amount is less than 5%, glass is more likely to be devitrified. When this content amount exceeds 20%, sufficient fusibility cannot be acquired. From such a viewpoint, this content amount is from 5% to 20%. Then, from a viewpoint of further improving the effects, a lower limit of this content amount is preferably 6% and more preferably 7%, and an upper limit of this content amount is preferably 15% and more preferably 10%.

An $Al^{3+}$ component is, for example, a component included as $Al_2O_3$ in the oxide-converted composition. $Al^{3+}$ is a component capable of increasing component stability during manufacturing of an optical glass and devitrification resistance of the optical glass. When this content amount is less than 18%, glass is more likely to be devitrified. When this content amount exceeds 35%, component stability during manufacturing of the optical glass decreases, and a fault in manufacturing is more likely to occur. From such a viewpoint, this content amount is from 18% to 35%. Then, from a viewpoint of further improving the effects, a lower limit of this content amount is preferably 19% and more preferably 20%, and an upper limit of this content amount is preferably 30% and more preferably 25%.

$La^{3+}$, $Y^{3+}$, and $Gd^{3+}$ that are rare-earth components are a component capable of increasing a refractive index without impairing low dispersibility, and are, for example, included as $La_2O_3$, $Y_2O_3$, and $Gd_2O_3$ in the oxide-converted composition, respectively. When the total amount of $La^{3+}$, $Y^{3+}$, and $Gd^{3+}$ ($La^{3+}+Y^{3+}+Gd^{3+}$) is small, the effect described above is not sufficient. When this total amount exceeds 50%, glass is more likely to be devitrified. From such a viewpoint, $La^{3+}+Y^{3+}+Gd^{3+}$ is from 15% to 50%. Then, from a viewpoint of further improving the effects, a lower limit of the total amount is preferably 25% and more preferably 35%, and an upper limit of the total amount is preferably 45% and more preferably 40%.

$La^{3+}$ is, for example, a component included as $La_2O_3$ in the oxide-converted composition. $La^{3+}$ has an effect of increasing a refractive index without impairing low dispersibility, and can also maintain devitrification resistance of glass. From such a viewpoint, this content amount is preferably from 0% to 50%. An upper limit thereof is more preferably 47% and further preferably 45%.

$Y^{3+}$ is, for example, a component included as $Y_2O_3$ in the oxide-converted composition. $Y^{3+}$ is a component capable of increasing a refractive index without impairing low dispersibility, and can further improve devitrification resistance by coexisting with $La^{3+}$ in glass in particular. From such a viewpoint, this content amount is preferably from 0% to 50%. An upper limit thereof is more preferably 10% and further preferably 5%. Then, both of $La^{3+}$ and $Y^{3+}$ are preferably contained.

$Gd^{3+}$ is, for example, a component included as $Gd_2O_3$ in the oxide-converted composition. $Gd^{3+}$ is a component capable of increasing a refractive index without impairing low dispersibility, and can further increase devitrification resistance by coexisting with $La^{3+}$ in glass in particular. From such a viewpoint, this content amount is preferably from 0% to 50%. An upper limit thereof is more preferably 10% and further preferably 5%. Then, both of $La^{3+}$ and $Gd^{3+}$ are preferably contained.

$Zr^{4+}$ is, for example, a component included as $ZrO_2$ in the oxide-converted composition. $Zr^{4+}$ has an effect of increasing devitrification resistance while maintaining low dispersibility. When this content amount is less than 2%, dispersibility increases. When this content amount exceeds 15%, glass is more likely to be devitrified. From such a viewpoint, this content amount is from 2% to 15%. Then, from a viewpoint of further improving the effects, a lower limit of this content amount is preferably 5% and more preferably 8%, and an upper limit of this content amount is preferably 13% and more preferably 12%.

$Ta^{5+}$ is, for example, a component included as $Ta_2O_5$ in the oxide-converted composition. $Ta^{5+}$ has an effect of increasing devitrification resistance while maintaining low dispersibility. When this content amount is less than 8%, dispersibility increases. When this content amount exceeds 30%, glass is more likely to be devitrified. From such a viewpoint, this content amount is from 8% to 30%. Then, from a viewpoint of further improving the effects, a lower limit of this content amount is preferably 9% and more preferably 10%, and an upper limit of this content amount is preferably 20% and more preferably 15%.

The optical glass according to the present embodiment satisfies a relationship in which $Al^{3+}/(Si^{4+}+Al^{3+})$ is from 0.5 to 0.85. By setting a combination so as to satisfy the relationship, both of fusibility and devitrification resistance can be achieved at a high level. From a viewpoint of further improving the effects, a lower limit of $Al^{3+}/(Si^{4+}+Al^{3+})$ is preferably 0.6 and more preferably 0.7, and an upper limit of $Al^{3+}/(Si^{4+}+Al^{3+})$ is preferably 0.8 and more preferably 0.75.

Furthermore, the optical glass according to the present embodiment preferably contains at least one component selected from a group consisting of $Mg^{2+}$, $Ca^{2+}$, $Sr^{2+}$, and $Ba^{2+}$ that are alkali earth metals. An alkali earth metal oxide $R^{2+}$ of these components (representing one or more kinds of R=Mg, Ca, Sr, Ba) is, for example, a component included as RO in the oxide-converted composition. Instead of only one kind of them, two or more kinds of them may be used. Such a component is further contained, and thus fusibility of glass can be further improved.

Then, from a viewpoint of further improving the effect described above, the total amount of $Mg^{2+}$, $Ca^{2+}$, $Sr^{2+}$, and $Ba^{2+}$ is preferably from 0% to 15%. An upper limit of the total amount is more preferably 10% and further preferably 5%.

$Ti^{4+}$ is, for example, a component included as $TiO_2$ in the oxide-converted composition. $Ti^{4+}$ can further increase low dispersibility. From viewpoints of such an effect and content amounts of rare-earth components and transition metal components, this content amount is preferably from 0% to 10%. Then, an upper limit of the content amounts is more preferably 7% and further preferably 4%.

$Nb^{5+}$ is, for example, a component included as $Nb_2O_5$ in the oxide-converted composition. $Nb^{5+}$ can further improve low dispersibility of glass. From a viewpoint of further improving this effect, this content amount is preferably from 0% to 30%. Then, a lower limit of this content amount is more preferably 3% and further preferably 5%, and an upper limit of this content amount is more preferably 20% and further preferably 10%.

$B^{3+}$ is, for example, a component that is included as $B_2O_3$ in the oxide-converted composition and constitutes a network former oxide. Then, $P^{5+}$ is, for example, a component that is included as $P_2O_5$ in the oxide-converted composition and constitutes a network former oxide. Glass formation performance can be more easily improved. On the other hand, since $B^{3+}$ and $P^{5+}$ are components having high volatility, a composition fluctuation of glass may be caused during manufacturing and stria may be actualized when $B^{3+}$ and $P^{5+}$ are excessively introduced. The optical glass according to the present embodiment can achieve vitrification without reducing the content amounts of $B^{3+}$ and $P^{5+}$ or without containing $B^{3+}$ and $P^{5+}$, and can provide excellent physical properties.

From the viewpoint described above, the content amount of $B^{3+}$ is preferably from 0% to 5%, more preferably from 0% to 3%, further preferably 0%. Then, from the viewpoint, it is preferable that $B^{3+}$ is not substantially contained. Note that, in the present specification, "not substantially contained" means that the component is not actively added, and does not exclude that the component is inevitably contained.

From the viewpoint described above, the content amount of $P^{5+}$ is preferably from 0% to 5%, more preferably from 0% to 3%, further preferably 0%. Then, from the viewpoint, it is preferable that $P^{5+}$ is not substantially contained.

An alkali metal $M^+$ ($Li^+$, $Na^+$, $K^+$, $Cs^+$) is, for example, a component that is included as $M_2O$ in the oxide-converted composition and constitutes a network former oxide. On the other hand, since the alkali metal M is a component having high volatility, a composition fluctuation of glass may be caused during manufacturing and stria may be actualized when the alkali metal $M^+$ is excessively introduced. The optical glass according to the present embodiment can achieve vitrification without reducing the content amount of the alkali metal $M^+$ or without containing the alkali metal $M^+$, and can provide excellent physical properties.

From the viewpoint described above, the total amount of the content amounts of $Li^+$, $Na^+$, $K^+$, and $Cs^+$ is preferably from 0% to 5%, more preferably 0% to 3%, and further preferably 0%. Then, from the viewpoint, it is preferable that $Li^+$, $Na^+$, $K^+$, and $Cs^+$ are not substantially contained.

The optical glass according to the present embodiment may further contain any other components within the bounds of not harming achievement of a purpose of the present embodiment.

Next, description is made on physical properties of the optical glass according to the present embodiment.

A difference ($\Delta T=T_p-T_g$) between a crystallization peak temperature ($T_p$) and a glass transition temperature ($T_g$) of the optical glass according to the present embodiment is preferably 130 degrees Celsius or more, more preferably 160 degrees Celsius or more, further preferably 170 degrees Celsius or more, still further preferably 180 degrees Celsius or more. $\Delta T$ can be used as an index of devitrification resistance. In general, high $\Delta T$ means high devitrification resistance of glass. Then, in the present embodiment, both of the crystallization peak temperature ($T_p$) and the glass transition temperature ($T_g$) can be measured by a differential thermal analysis.

The optical glass according to the present embodiment can be suitably used as an optical glass related to a high refractive index region. From such a viewpoint, a refractive index ($n_d$) with respect to a d-line (wavelength: 587.562 nm) of the optical glass according to the present embodiment is preferably from 1.95 to 2.05. From the viewpoint, a lower limit of the refractive index is more preferably 1.97, further preferably 1.99. An upper limit of the refractive index is more preferably 2.03, further preferably 2.01.

The optical glass according to the present embodiment is a glass having low dispersibility (high abbe number ($v_d$)). An abbe number ($v_d$) of the optical glass according to the present embodiment is preferably from 25 to 40. From the viewpoint, a lower limit of the abbe number is more preferably 27, further preferably 29. An upper limit of the abbe number is more preferably 37, further preferably 35.

The optical glass according to the present embodiment can be a thick optical glass. Specifically, a maximum value of a thickness of the optical glass according to the present embodiment is preferably 6 mm or more, more preferably 6.2 mm or more, further preferably 6.4 mm or more. A "maximum value of a thickness" herein refers to a maximum value in a thickness direction in a case of a lens shape, and refers to a diameter value in a case of a substantially spherical shape.

The optical glass according to the present embodiment is suitable as an optical element such as a lens included in an optical device such as a camera and a microscope. Such an optical element includes a mirror, a lens, a prism, a filter, and the like. Examples of an optical system including the optical element include, for example, an objective lens, a condensing lens, an image forming lens, and an interchangeable camera lens. The optical system can be used for an imaging device, such as a camera with an interchangeable lens and a camera with a non-interchangeable lens, and a microscope such as a multi-photon microscope. Note that, the optical device is not limited to the imaging device and the microscope described above, and also includes a video camera, a teleconverter, a telescope, a binocular, a monocular, a laser range finder, a projector, and the like. An example thereof will be described below.

<Multi-Photon Microscope>

FIG. 1 is a block diagram illustrating an example of a configuration of a multi-photon microscope including an optical element using the optical glass according to the present embodiment.

A multi-photon microscope 1 includes an objective lens 106, a condensing lens 108, and an image forming lens 110. At least one of the objective lens 106, the condensing lens 108, and the image forming lens 110 includes an optical element including, as a base material, the optical glass according to the present embodiment. Hereinafter, description is mainly made on the optical system of the multi-photon microscope 1.

A pulse laser device 101 emits ultrashort pulse light having, for example, a near infrared wavelength (approximately 1,000 nm) and a pulse width of a femtosecond unit (for example, 100 femtoseconds). In general, ultrashort pulse light immediately after being emitted from the pulse laser device 101 is linearly polarized light that is polarized in a predetermined direction.

A pulse division device 102 divides the ultrashort pulse light, increases a repetition frequency of the ultrashort pulse light, and emits the ultrashort pulse light.

A beam adjustment unit 103 has a function of adjusting a beam diameter of the ultrashort pulse light, which enters from the pulse division device 102, to a pupil diameter of the objective lens 106, a function of adjusting convergence and divergence angles of the ultrashort pulse light in order to correct chromatic aberration (a focus difference) on an axis of a wavelength of multi-photon excitation light emitted from a sample S and the wavelength of the ultrashort pulse light, a pre-chirp function (group velocity dispersion compensation function) providing inverse group velocity dispersion to the ultrashort pulse light in order to correct the pulse width of the ultrashort pulse light, which is increased due to group velocity dispersion at the time of passing through the optical system, and the like.

The ultrashort pulse light emitted from the pulse laser device 101 has a repetition frequency increased by the pulse division device 102, and is subjected to the above-mentioned adjustments by the beam adjustment unit 103. Furthermore, the ultrashort pulse light emitted from the beam adjustment unit 103 is reflected on a dichroic mirror 104 in a direction toward a dichroic mirror 105, passes through the dichroic mirror 105, is converged by the objective lens 106, and is radiated to the sample S. At this time, an observation surface of the sample S may be scanned with the ultrashort pulse light through use of scanning means (not illustrated).

For example, when the sample S is subjected to fluorescence imaging, a fluorescent pigment by which the sample S is dyed is subjected to multi-photon excitation in an irradiated region with the ultrashort pulse light and the vicinity thereof on the sample S, and fluorescence having a wavelength shorter than a near infrared wavelength of the ultrashort pulse light (hereinafter, also referred to "observation light") is emitted.

The observation light emitted from the sample S in a direction toward the objective lens 106 is collimated by the objective lens 106, and is reflected on the dichroic mirror 105 or passes through the dichroic mirror 105 depending on the wavelength.

The observation light reflected on the dichroic mirror 105 enters a fluorescence detection unit 107. For example, the fluorescence detection unit 107 is formed of a barrier filter, a photo multiplier tube (PMT), or the like, receives the observation light reflected on the dichroic mirror 105, and outputs an electronic signal depending on an amount of the light. The fluorescence detection unit 107 detects the observation light over the observation surface of the sample S, in conformity with the ultrashort pulse light scanning on the observation surface of the sample S.

Meanwhile, the observation light passing through the dichroic mirror 105 is de-scanned by scanning means (not illustrated), passes through the dichroic mirror 104, is converged by the condensing lens 108, passes through a pinhole 109 provided at a position substantially conjugate to a focal position of the objective lens 106, passes through the image forming lens 110, and enters a fluorescence detection unit 111. For example, the fluorescence detection unit 111 is formed of a barrier filter, a PMT, or the like, receives the observation light formed at the reception surface of the fluorescence detection unit 111 by the image forming lens 110, and outputs an electronic signal depending on an amount of the light. The fluorescence detection unit 111 detects the observation light over the observation surface of the sample S, in conformity with the ultrashort pulse light scanning on the observation surface of the sample S.

Note that, all the observation light emitted from the sample S in a direction toward the objective lens 106 may be detected by the fluorescence detection unit 111 by excluding the dichroic mirror 105 from the optical path.

The observation light emitted from the sample S in a direction opposite to the objective lens 106 is reflected on a dichroic mirror 112, and enters a fluorescence detection unit 113. The fluorescence detection unit 113 is formed of, for example, a barrier filter, a PMT, or the like, receives the observation light reflected on the dichroic mirror 112, and outputs an electronic signal depending on an amount of the light. The fluorescence detection unit 113 detects the observation light over the observation surface of the sample S, in conformity with the ultrashort pulse light scanning on the observation surface of the sample S.

The electronic signals output from the fluorescence detection units 107, 111, and 113 are input to, for example, a computer (not illustrated). The computer is capable of generating an observation image, displaying the generated observation image, storing data on the observation image, based on the input electronic signals.

<Imaging Device>

The optical element using the optical glass according to the present embodiment can also be suitably used for an imaging device such as a digital single lens reflex camera and a digital still camera.

Figure 2:
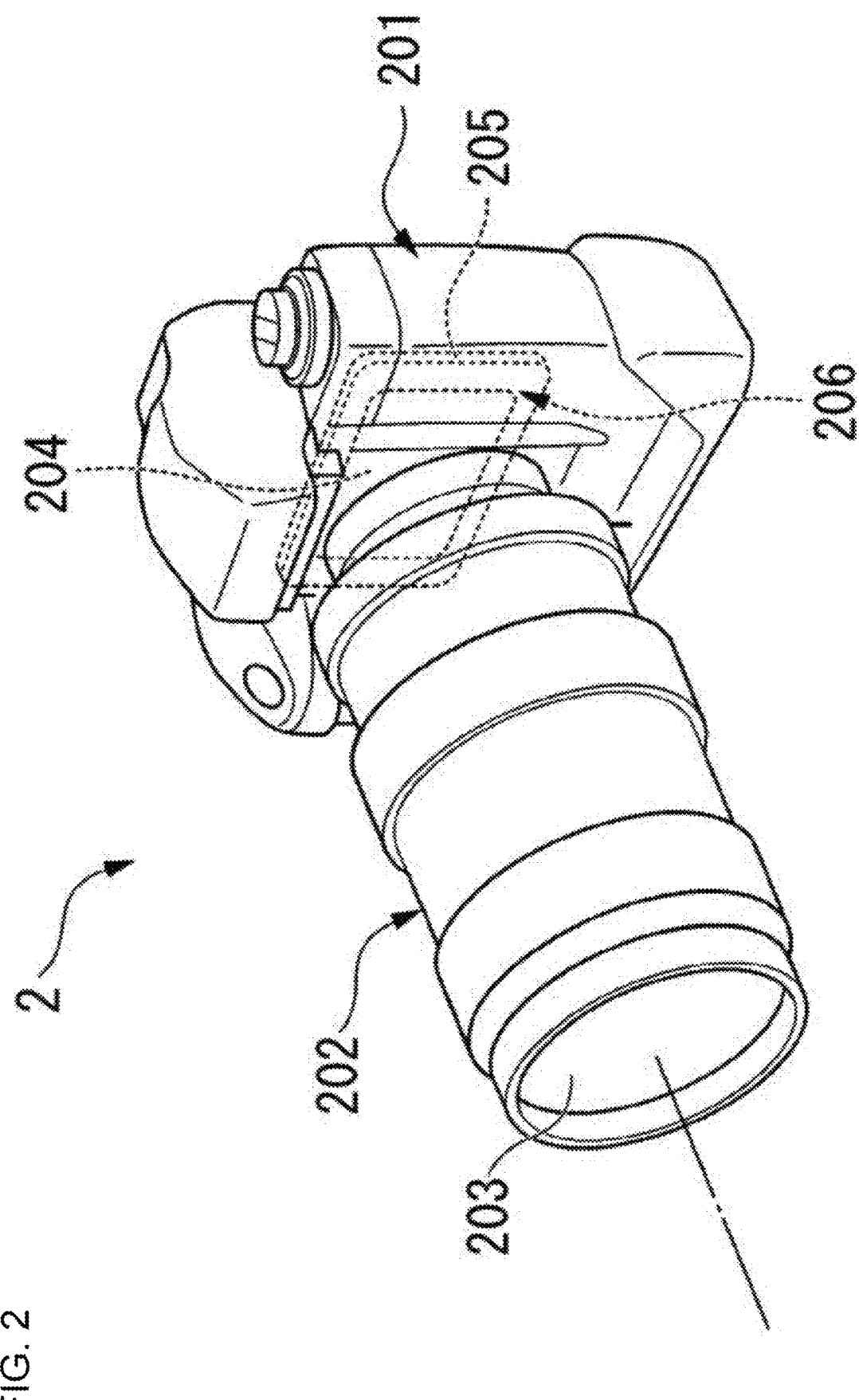
FIG. 2 is a perspective view of an imaging device including the optical element using the optical glass according to the present embodiment.

FIG. 2 is a perspective view of an imaging device including the optical element using the optical glass according to the present embodiment.

An imaging device 2 is a so-called digital single-lens reflex camera (a lens-interchangeable camera), and a photographing lens 203 (an optical system) includes an optical element including, as a base material, the optical glass according to the present embodiment. A lens barrel 202 is mounted to a lens mount (not illustrated) of a camera body 201 in a removable manner. An image is formed with light, which passes through the lens 203 of the lens barrel 202, on a sensor chip (solid-state imaging elements) 204 of a multi-chip module 206 arranged on a back surface side of the camera body 201. The sensor chip 204 is a so-called bare chip such as a CMOS image sensor. The multi-chip module 206 is, for example, a Chip On Glass (COG) type module including the sensor chip 204 being a bare chip mounted on a glass substrate 205.

Figure 3:
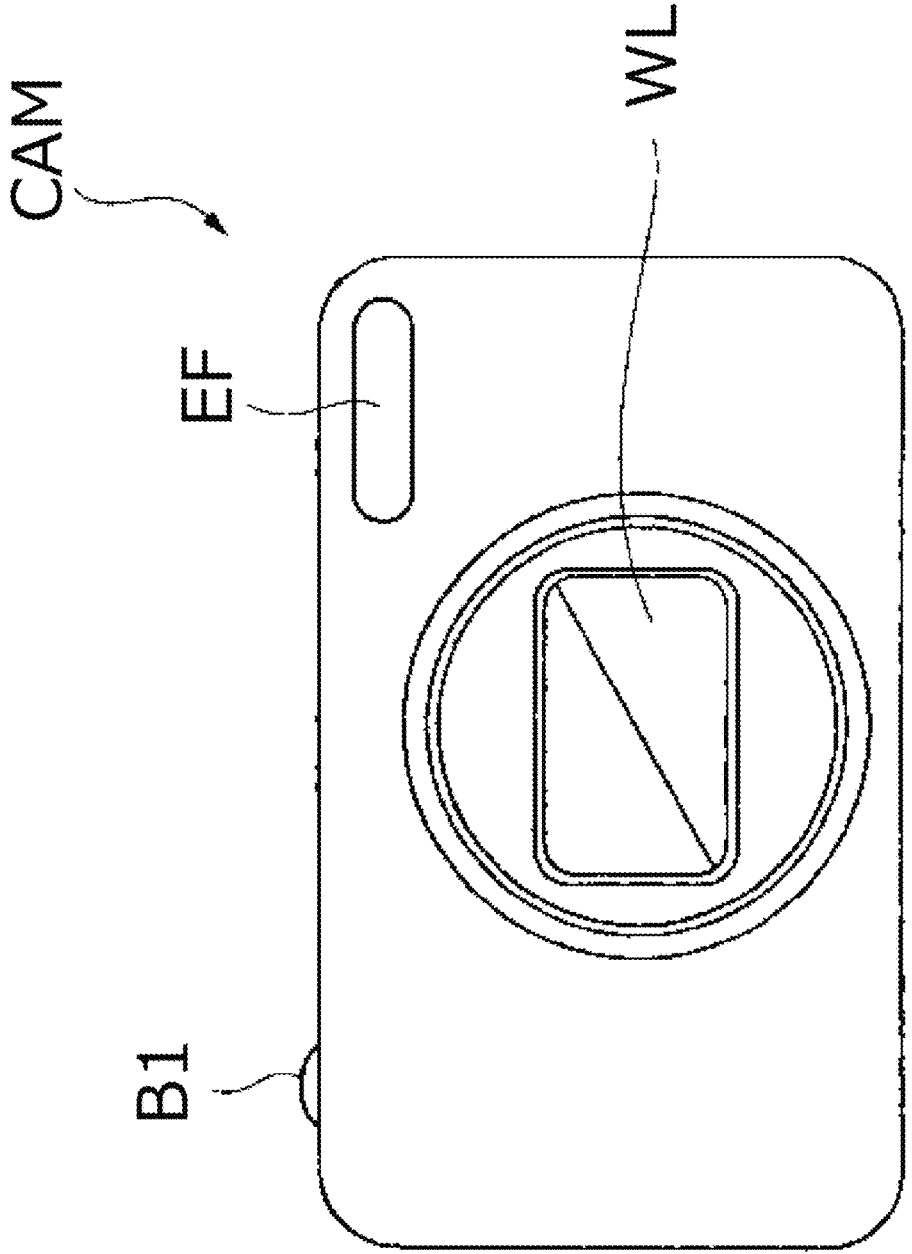
FIG. 3 is a front view of another example of the imaging device including the optical element using the optical glass according to the present embodiment.
Figure 4:
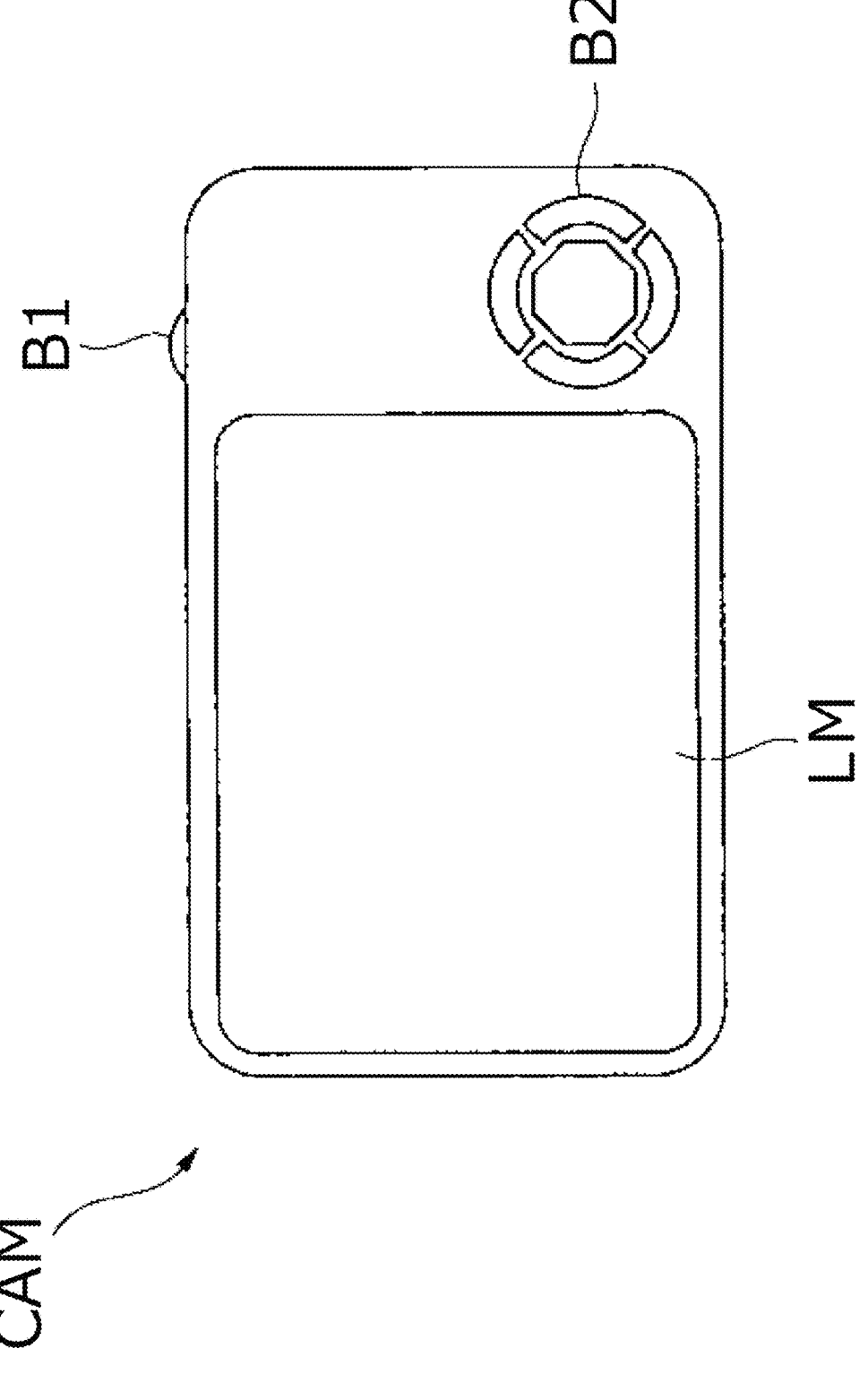
FIG. 4 is a rear view of the imaging device in FIG. 3.

FIG. 3 is a front view of another example of the imaging device including the optical element using the optical glass according to the present embodiment. FIG. 4 is a rear view of the imaging device in FIG. 3.

The imaging device CAM is a so-called digital still camera (a fixed lens camera), and a photographing lens WL (an optical system) includes an optical element including, as a base material, the optical glass according to the present embodiment.

When a power button (not illustrated) of the imaging device CAM is pressed, a shutter (not illustrated) of the photographing lens WL is opened, light from an object to be imaged (a body) is converged by the photographing lens WL and forms an image on imaging elements arranged on an image surface. An object image formed on the imaging elements is displayed on a liquid crystal monitor LM arranged on the back of the imaging device CAM. A photographer decides composition of the object image while viewing the liquid crystal monitor LM, then presses down a release button B1, and captures the object image on the imaging elements. The object image is recorded and stored in a memory (not illustrated).

An auxiliary light emitting unit EF that emits auxiliary light in a case that the object is dark and a function button B2 to be used for setting various conditions of the imaging device CAM and the like are arranged on the imaging device CAM.

A higher resolution, lighter weight, a smaller size, and the like are demanded for the optical system to be used in such a digital camera or the like. In order to achieve such demands, it is effective to use glass with a high refractive index as the optical system. From such a viewpoint, the optical glass according to the present embodiment is suitable as a member of such an optical device.

<Method for Manufacturing Optical Glass>

The optical glass according to the present embodiment can be manufactured by using a floating furnace, for example. There are electrostatic, electromagnetic, sonic, magnetic, and gas jet floating furnaces, and the like, which are not particularly limited, but a gas jet floating furnace is preferably used for floating fusion of an oxide. Hereinafter, a manufacturing method using a gas jet floating furnace will be described as one example.

Figure 5:
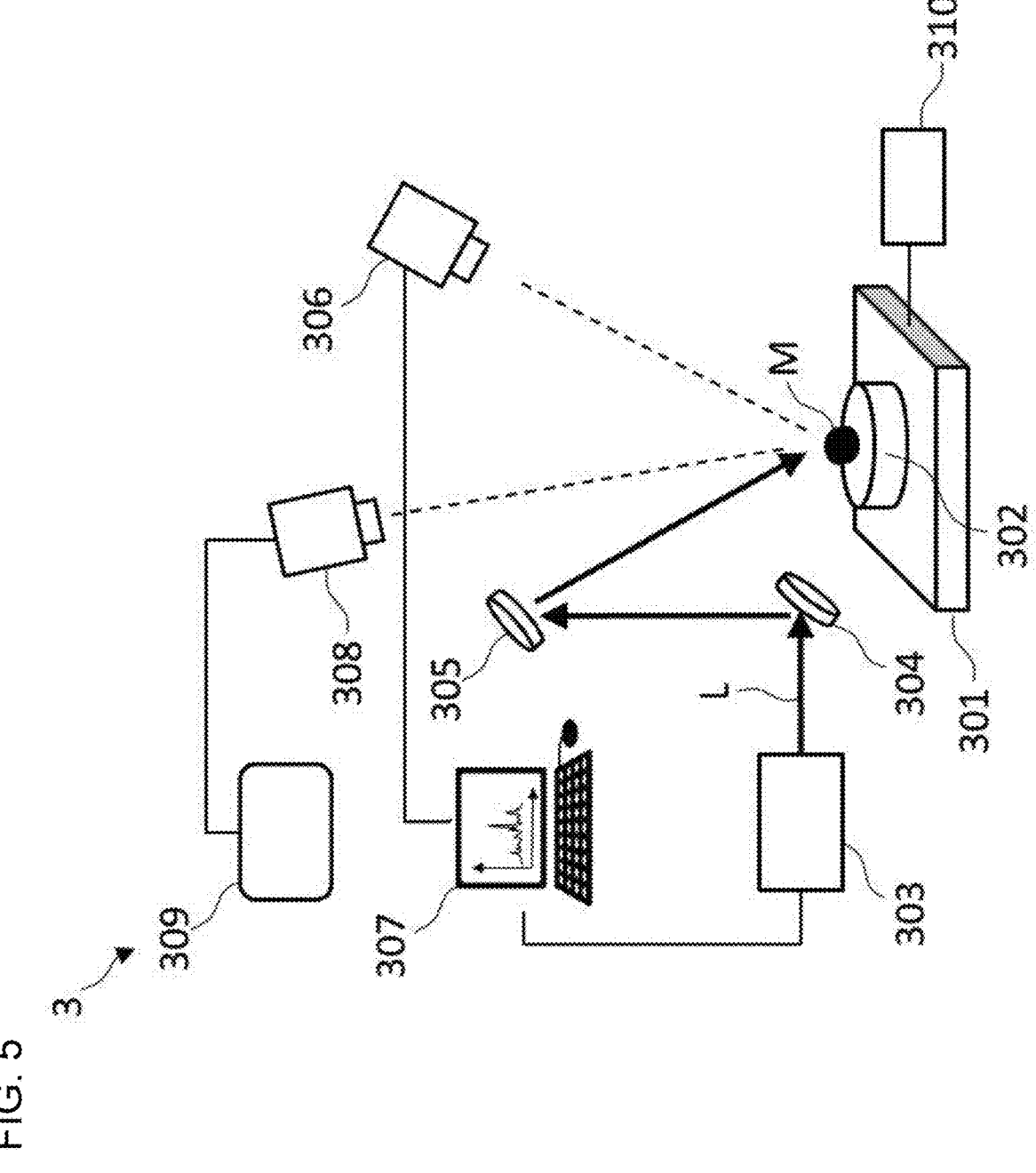
FIG. 5 is a schematic diagram of an overall configuration of a gas jet floating furnace.
Figure 6:
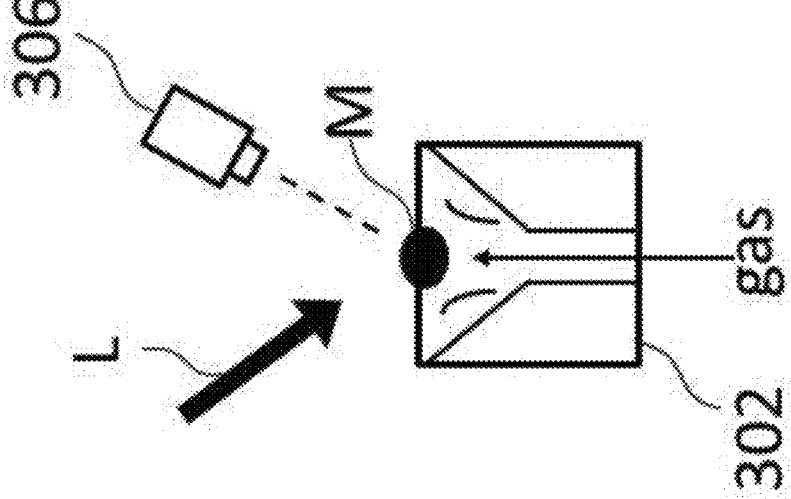
FIG. 6 is an enlarged schematic diagram of a pedestal on a stage of the gas jet floating furnace.

FIG. 5 illustrates a schematic diagram of an overall configuration of the gas jet floating furnace, and FIG. 6 is an enlarged schematic diagram of a pedestal on a stage of the gas jet floating furnace.

In a gas jet floating furnace 3, a raw material M is disposed on a pedestal 302 on a stage 301. Then, laser light L emitted from a laser light source 303 is applied to the raw material M via a mirror 304 and a mirror 305. A temperature of the raw material M heated by application of the laser light L is monitored by a radiation thermometer 306. Output of the laser light source 303 is controlled by a computer 307, based on temperature information of the raw material M monitored by the radiation thermometer 306. Further, a state of the raw material M is captured by a CCD camera 308, and is output to a monitor 309 (see FIG. 5). Note that, for example, a carbon dioxide gas laser can be used as a laser light source.

In the gas jet floating furnace 3, the raw material M is in a floating state due to gas sent to the pedestal (see FIG. 6). A flow rate of gas sent to the pedestal is controlled by a gas flow rate regulator 310. For example, non-contact heating can be performed by the laser light L with the raw material M in a floating state by jetting gas from a nozzle having a conical hole. When the raw material M is fused, the raw material M has a spherical shape or an elliptical shape due to its own surface tension, and floats in this state.

Subsequently, when the laser light L is cut off, the raw material that has been brought into a melted liquid state is cooled to acquire a transparent glass. Note that a kind of gas is not particularly limited, and publicly known gas may be adopted as appropriate. Examples of the gas include oxygen, nitrogen, carbon dioxide, argon, air, and the like. A shape of a nozzle and a heating method are not particularly limited, and a publicly known method may be adopted as appropriate.

In the related art, for example, when an optical glass has been manufactured by using a container such as a crucible, a lot of network former oxides such as $SiO_2$, $B_2O_3$, $P_2O_5$, and $GeO_2$ has needed to be contained to increase glass formation performance. Thus, in a case of a glass composition having a great content amount of a material that is not a network former oxide and a small content amount of the network former oxide described above, there has been a circumstance where crystallization (non-uniform nucleation) with a container-melted liquid interface as an origin occurs, and vitrification cannot often be achieved. A glass gob has been sometimes used as a material of an optical lens of various types of optical equipment, but it has been desired that a large glass gob can be stably manufactured.

In this regard, in the present embodiment, for example, when an optical glass is manufactured by a method using the floating furnace described above, there is no contact between a container and a melted liquid, and thus non-uniform nucleation can be suppressed to the maximum. As a result, glass formation from a melted liquid can be greatly promoted, and vitrification can be achieved even with a composition that cannot be manufactured in crucible fusion and has a small content amount of a network former oxide or does not contain the network former oxide at all. By adopting the manufacturing method, the optical glass having a composition system according to the present embodiment in which vitrification could not have been achieved in the related art can be manufactured. Furthermore, a large glass gob as described above can also be manufactured. In addition, the optical glass according to the present embodiment has a high refractive index and has a high abbe number. Since the optical glass according to the present embodiment has many advantages as described above, the optical glass can be applied as a high-refractive low-dispersibility glass material and a wide-band transparent material.

EXAMPLES

Next, description is made on examples and comparative examples below, but the present invention is not limited at all by examples below.

Manufacturing of Optical Glass in Each Example

An optical glass in each example has been manufactured according to the following procedure by using the gas jet floating furnace 3 illustrated in FIGS. 5 and 6. First, a raw material selected from an oxide, a hydroxide, a carbonate, a nitrate, a sulfate, and the like was weighed so as to acquire a predetermined chemical composition, and was then mixed in an alumina mortar. This raw material was uniaxially pressurized at 20 MPa, and was formed into a columnar pellet. The acquired pellet was baked at 1000 to 1300 degrees Celsius in an electric furnace for 6 to 12 hours in the atmosphere to manufacture a sintered body. The acquired sintered body was roughly crushed, and 500 to 600 mg was collected and installed on a nozzle of a pedestal. Then, the raw material was melted by applying a carbon dioxide gas laser from above while jetting oxygen gas. The melted raw material had a spherical shape or an elliptical shape due to its own surface tension, and was brought into a floating state by pressure of the gas. Laser output was cut off with the raw material completely melted, and the raw material was cooled to acquire a glass sphere having a diameter of 6 mm. In all the glass in the examples, volatilization visible during fusion was not confirmed, and an air bubble and devitrification were also not confirmed.

Manufacturing of Optical Glass in Each Comparative Example

An optical glass in each comparative example has also been manufactured according to a procedure similar to that in the examples described above by using the gas jet floating furnace 3 illustrated in FIGS. 5 and 6.
(Manufacturing of Glass Gob>

When a substantially spherical glass gob having a diameter of 6 mm could be manufactured in each example and each comparative example, "vitrified" was described, and when sufficient melting was not achieved due to crystallization of a component, "devitrified" was described.
(Measurement of Crystallization Peak Temperature ($T_p$), Glass Transition Temperature ($T_g$), and Temperature Difference ($\Delta T$) Therebetween)

Both of a crystallization peak temperature ($T_p$) and a glass transition temperature ($T_g$) were measured by a differential thermal analysis (rising temperature 10 degrees Celsius/min) in a temperature rising process to acquire a temperature difference ($\Delta T$) of $T_p - T_g$.
(Measurement of Refractive Index and Abbe Number)

A refractive index measurement of glass was performed by using a prism coupler (manufactured by Metricon, model "2010/M"). A glass sample was polished, a polished surface was brought into close contact with a single crystal rutile prism, and a total reflection angle when light at a measurement wavelength was incident was measured to acquire a refractive index. A measurement at each of three wavelengths of 473 nm, 594.1 nm, and 656 nm was performed for five times to acquire an average value as a measurement value. Furthermore, a refractive index in a d-line (587.562 nm), an F-line (486.133 nm), and a C-line (656.273 nm) and an abbe number ($v_d$) were calculated by performing, on the actual measurement value that is thus acquired, fitting by a least squares method by using a dispersion equation of Drude-Voigt below.

[Math. 1]

$$\frac{1}{n^2 - 1} = \frac{\pi m c^2}{e^2 N f}\left(\frac{1}{\lambda_0^2} - \frac{1}{\lambda^2}\right) \qquad \text{Math. 1}$$

(n: refractive index, m: electron mass, c: light velocity, e: charge elementary quantity, N: the number of molecules per unit volume, f: oscillator strength, $\lambda_0$: natural resonance wavelength, $\lambda$: wavelength)

An abbe number ($v_d$) is defined by the following equation.

[Math. 2]

$$v_d = \frac{n_d - 1}{n_F - n_C} \qquad \text{Math. 2}$$

($n_d$: refractive index with respect to d-line, $n_F$: refractive index with respect to F-line, $n_C$: refractive index with respect to C-line)

Each table indicates compositions and physical properties in each example and each comparative example. Note that a content amount of each component is expressed with cation % unless otherwise stated.

Figure 7:
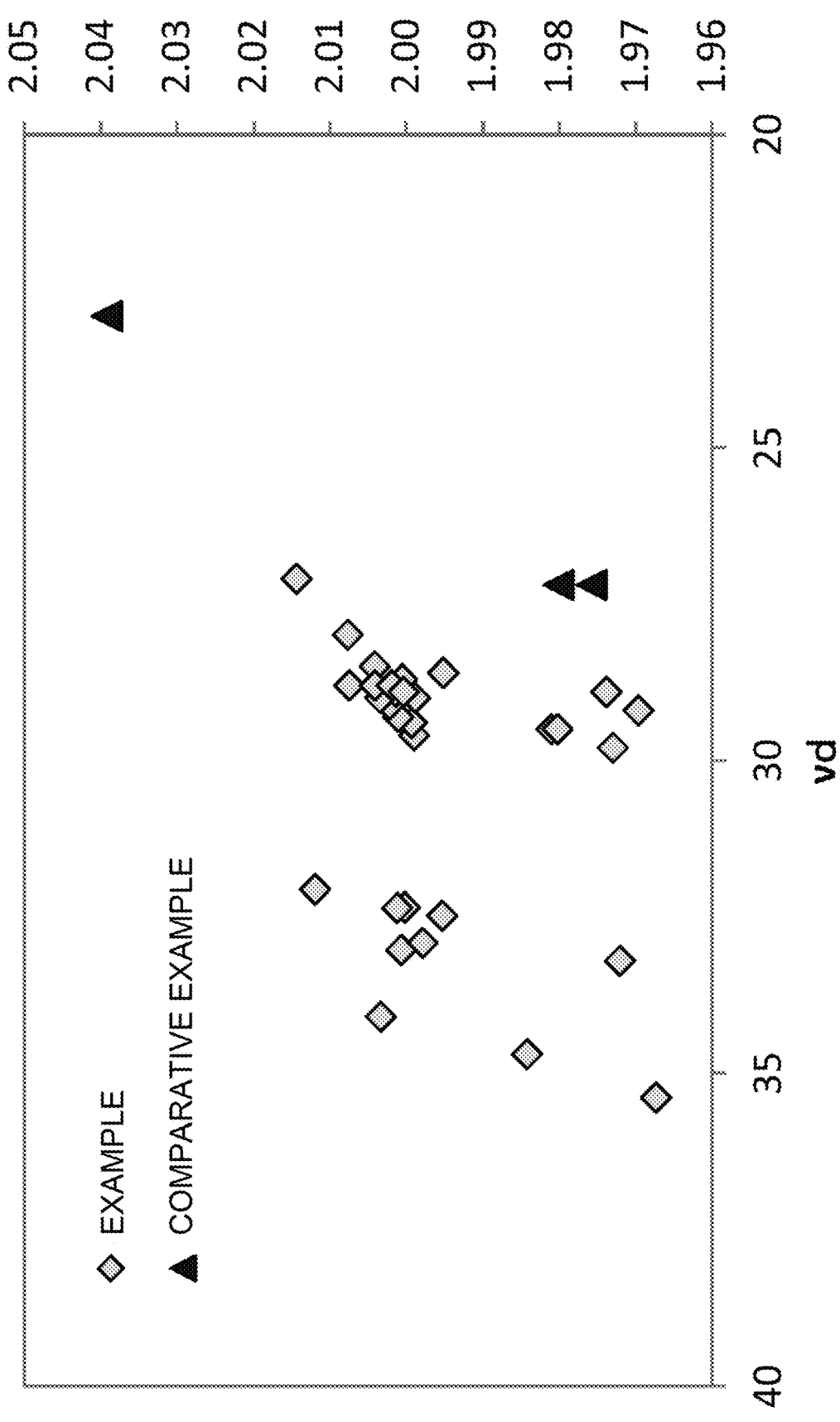
FIG. 7 is a graph in which an optical constant value of each example and each comparative example is plotted.

FIG. 7 is a graph in which an optical constant value of each example and each comparative example is plotted.

TABLE 1

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| $Si^{4+}$ | 16.89 | 12.52 | 6.89 | 15.20 | 8.43 | 8.43 | 8.43 | 12.79 |
| $Al^{3+}$ | 20.12 | 21.17 | 30.12 | 20.53 | 22.77 | 22.77 | 22.77 | 21.69 |
| $Mg^{2+}$ | | | | | | | | |
| $Ca^{2+}$ | | | | | | | | |
| $Sr^{2+}$ | | | | | 12.00 | 12.00 | 9.00 | 8.57 |
| $Ba^{2+}$ | | | | | | | | |
| $La^{3+}$ | 32.60 | 34.31 | 32.60 | 33.26 | 15.91 | 15.91 | 15.91 | 15.15 |
| $Y^{2+}$ | | | | | | | | |
| $Gd^{3+}$ | 3.77 | 3.98 | 3.77 | 3.85 | 4.27 | 4.27 | 4.27 | 4.07 |
| $Ti^{4+}$ | | | | | 9.00 | | | |
| $Zr^{4+}$ | 4.44 | 4.67 | 4.44 | 4.53 | 2.51 | 2.51 | 2.51 | 2.39 |
| $Nb^{5+}$ | | | | 10.2 | 11.32 | 20.32 | 23.32 | 22.21 |
| $Ta^{5+}$ | 22.18 | 23.35 | 22.18 | 12.43 | 13.79 | 13.79 | 13.79 | 13.13 |
| Total | 100.00 | 100.00 | 100.00 | 100.00 | 100.00 | 100.00 | 100.00 | 100.00 |
| $Al^{3+}/(Si^{4+} + Al^{3+})$ | 0.54 | 0.63 | 0.81 | 0.57 | 0.73 | 0.73 | 0.73 | 0.63 |
| MANUFACTURING OF CLASS GOB ($\phi$ 6) | VITRIFIED | VITRIFIED | VITRIFIED | VITRIFIED | VITRIFIED | VITRIFIED | VITRIFIED | VITRIFIED |
| Tg(° C.) | 877 | 885 | 855 | 835 | 797 | 798 | 787 | 783 |
| Tp(° C.) | 1104 | 1093 | 1025 | 1061 | 976 | 979 | 959 | 1034 |
| Tp − Tg (° C.) | 227 | 208 | 170 | 226 | 179 | 181 | 172 | 251 |
| $n_d$ | 1.97210 | 1.98425 | 1.96734 | 2.00334 | 1.97384 | 1.97302 | 1.99518 | 1.96964 |
| $v_d$ | 33.2 | 34.7 | 35.4 | 34.1 | 28.9 | 29.8 | 28.6 | 29.2 |

TABLE 2

|  | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|
| $Si^{4+}$ | 8.03 | 8.03 | 8.03 | 8.03 | 8.03 | 8.03 | 8.03 | 9.72 |
| $Al^{3+}$ | 26.45 | 21.69 | 21.69 | 21.69 | 21.69 | 21.69 | 21.69 | 23.62 |
| $Mg^{2+}$ | | | | | | | | |
| $Ca^{2+}$ | | | | | | | | |
| $Sr^{2+}$ | 8.57 | 13.33 | 8.57 | 8.57 | 8.57 | 8.57 | 8.57 | 3.88 |
| $Ba^{2+}$ | | | | | | | | |
| $La^{3+}$ | 15.15 | 15.15 | 19.91 | 15.15 | 15.15 | 15.15 | 15.14 | 20.25 |
| $Y^{3+}$ | | | | | | | | |
| $Gd^{3+}$ | 4.07 | 4.07 | 4.07 | 8.83 | 4.07 | 4.07 | 4.07 | 4.14 |
| $Ti^{4+}$ | | | | | | | | |
| $Zr^{4+}$ | 2.39 | 2.39 | 2.39 | 2.39 | 7.15 | 2.39 | 2.39 | 2.43 |
| $Nb^{5+}$ | 22.21 | 22.21 | 22.21 | 22.21 | 22.21 | 26.97 | 22.21 | 22.60 |
| $Ta^{5+}$ | 13.13 | 13.13 | 13.13 | 13.13 | 13.13 | 13.13 | 17.9 | 13.36 |
| Total | 100.00 | 100.00 | 100.00 | 100.00 | 100.00 | 100.00 | 100.00 | 100.00 |
| $Al^{3+}/(Si^{4+} + Al^{3+})$ | 0.77 | 0.73 | 0.73 | 0.73 | 0.73 | 0.73 | 0.73 | 0.71 |
| MANUFACTURING OF GLASS GOB ($\phi$ 6) | VITRIFIED | VITRIFIED | VITRIFIED | VITRIFIED | VITRIFIED | VITRIFIED | VITRIFIED | VITRIFIED |
| Tg(° C.) | 784 | 799 | 803 | 802 | 791 | 774 | 781 | 787 |
| Tp(° C.) | 945 | 987 | 975 | 974 | 973 | 945 | 963 | 968 |
| Tp − Tg (° C.) | 161 | 188 | 172 | 172 | 182 | 171 | 182 | 181 |
| $n_d$ | 1.98109 | 1.98026 | 1.99902 | 1.99931 | 2.00750 | 2.01437 | 2.00769 | 2.00106 |
| $v_d$ | 29.5 | 29.5 | 29.6 | 29.4 | 28.8 | 27.1 | 28.0 | 29.3 |

TABLE 3

| | EXAMPLE 17 | EXAMPLE 18 | EXAMPLE 19 | EXAMPLE 20 | EXAMPLE 21 | EXAMPLE 22 | EXAMPLE 23 | EXAMPLE 24 |
|---|---|---|---|---|---|---|---|---|
| $Si^{4+}$ | 8.81 | 13.61 | 13.61 | 12.49 | 14.57 | 10.03 | 12.03 | 10.66 |
| $Al^{3+}$ | 22.22 | 21.48 | 21.48 | 23.51 | 20.57 | 23.82 | 21.18 | 22.22 |
| $Mg^{2+}$ | | | | | | | | |
| $Ca^{2+}$ | | | | | | | | |
| $Sr^{2+}$ | 8.41 | | | | | 3.85 | 3.72 | 3.90 |
| $Ba^{2+}$ | | | | | | | | |
| $La^{3+}$ | 14.86 | 20.67 | 24.7 | 23.42 | 22.74 | 21.6 | 20.63 | 22.61 |
| $Y^{3+}$ | | | | | | | | |
| $Gd^{3+}$ | 3.99 | 4.03 | | | | | | |
| $Ti^{4+}$ | | | | | | | | |
| $Zr^{4+}$ | 7.02 | 2.37 | 2.37 | 2.34 | 4.98 | 2.42 | 5.13 | 2.45 |
| $Nb^{5+}$ | 21.8 | 22.00 | 22.00 | 21.69 | 21.07 | 22.42 | 21.69 | 22.75 |
| $Ta^{5+}$ | 12.89 | 15.84 | 15.84 | 16.55 | 16.07 | 15.86 | 15.62 | 15.41 |
| Total | 100.00 | 100.00 | 100.00 | 100.00 | 100.00 | 100.00 | 100.00 | 100.00 |
| $Al^{3+}/(Si^{4+} + Al^{3+})$ | 0.72 | 0.61 | 0.61 | 0.65 | 0.59 | 0.70 | 0.64 | 0.68 |
| MANUFACTURING OF GLASS GOB (φ 6) | VITRIFIED | VITRIFIED | VITRIFIED | VITRIFIED | VITRIFIED | VITRIFIED | VITRIFIED | VITRIFIED |
| Tg(° C.) | 789 | 781 | 785 | 782 | 787 | 780 | 780 | 780 |
| Tp(° C.) | 977 | 1036 | 1033 | 1010 | 1047 | 958 | 1025 | 977 |
| Tp – Tg (° C.) | 188 | 255 | 248 | 228 | 260 | 178 | 245 | 197 |
| $n_d$ | 1.99887 | 2.00193 | 2.00219 | 2.00056 | 2.00138 | 2.00340 | 2.00415 | 2.00411 |
| $v_d$ | 29.0 | 28.8 | 29.1 | 28.7 | 28.9 | 29.0 | 28.5 | 28.8 |

TABLE 4

| | EXAMPLE 25 | EXAMPLE 26 | EXAMPLE 27 | EXAMPLE 28 | EXAMPLE 29 | EXAMPLE 30 | EXAMPLE 31 | EXAMPLE 32 |
|---|---|---|---|---|---|---|---|---|
| $Si^{4+}$ | 14.57 | 12.03 | 8.43 | 8.18 | 7.79 | 8.66 | 9.45 | 8.02 |
| $Al^{3+}$ | 20.57 | 21.18 | 22.77 | 22.11 | 21.06 | 20.86 | 21.25 | 21.68 |
| $Mg^{2+}$ | | | | | | | | |
| $Ca^{2+}$ | | | | | | | | |
| $Sr^{2+}$ | | 3.72 | | | | | | |
| $Ba^{2+}$ | | | | | | | | |
| $La^{3+}$ | 18.22 | 15.63 | 36.91 | 39.98 | 38.07 | 37.71 | 37.08 | 39.19 |
| $Y^{3+}$ | | | | | | | | |
| $Gd^{3+}$ | 4.52 | 5.00 | 4.27 | | | | | |
| $Ti^{4+}$ | | | | | | | | |
| $Zr^{4+}$ | 4.98 | 5.13 | 2.51 | 5.35 | 9.86 | 9.77 | 9.60 | 10.15 |
| $Nb^{5+}$ | 21.07 | 21.69 | 11.32 | 10.99 | 10.47 | 5.65 | 10.2 | 7.83 |
| $Ta^{5+}$ | 16.07 | 15.62 | 13.79 | 13.39 | 12.75 | 17.35 | 12.42 | 13.13 |
| Total | 100.00 | 100.00 | 100.00 | 100.00 | 100.00 | 100.00 | 100.00 | 100.00 |
| $Al^{3+}/(Si^{4+} + Al^{3+})$ | 0.59 | 0.64 | 0.73 | 0.73 | 0.73 | 0.71 | 0.69 | 0.73 |
| MANUFACTURING OF GLASS GOB (φ 6) | VITRIFIED | VITRIFIED | VITRIFIED | VITRIFIED | VITRIFIED | VITRIFIED | VITRIFIED | VITRIFIED |
| Tg(° C.) | 792 | 785 | 861 | 860 | 845 | 862 | 847 | 858 |
| Tp(° C.) | 1040 | 1027 | 1093 | 1089 | 1035 | 1056 | 1062 | 1046 |
| Tp – Tg (° C.) | 248 | 242 | 232 | 229 | 190 | 194 | 215 | 188 |
| $n_d$ | 2.00194 | 2.00034 | 1.99530 | 2.00019 | 2.01194 | 2.00068 | 2.00122 | 1.99786 |
| $v_d$ | 28.8 | 28.9 | 32.48 | 32.35 | 32.06 | 33.03 | 32.36 | 32.92 |

TABLE 5

| | COMPARTIVE EXAMPLE 1 | COMPARTIVE EXAMPLE 2 | COMPARTIVE EXAMPLE 3 | COMPARTIVE EXAMPLE 4 | COMPARTIVE EXAMPLE 5 | COMPARTIVE EXAMPLE 6 |
|---|---|---|---|---|---|---|
| $Si^{4+}$ | 22.74 | 18.14 | 20.7 | 14.80 | 8.43 | 8.43 |
| $Al^{3+}$ | 1.64 | 6.84 | 11.09 | 22.20 | 32.77 | 32.77 |
| $Mg^{2+}$ | | | | | | |
| $Ca^{2+}$ | 9.54 | 9.47 | | | | 5.00 |
| $Sr^{2+}$ | | | | | 5.00 | |
| $Ba^{2+}$ | | | | | | |
| $La^{3+}$ | 33.09 | 32.82 | 20.09 | 18.90 | 9.91 | 9.91 |
| $Y^{3+}$ | | | | | | |

TABLE 5-continued

| | COMPARTIVE EXAMPLE 1 | COMPARTIVE EXAMPLE 2 | COMPARTIVE EXAMPLE 3 | COMPARTIVE EXAMPLE 4 | COMPARTIVE EXAMPLE 5 | COMPARTIVE EXAMPLE 6 |
|---|---|---|---|---|---|---|
| $Gd^{3+}$ | 11.86 | 11.77 | 4.40 | | 4.27 | 4.27 |
| $Ti^{4+}$ | | | | 37.80 | 12.00 | 12.00 |
| $Zr^{4+}$ | 3.94 | 3.91 | 7.55 | 6.30 | 2.51 | 2.51 |
| $Nb^{5+}$ | 4.85 | 4.81 | 20.52 | | 11.32 | 11.32 |
| $Ta^{5+}$ | 12.34 | 12.24 | 15.65 | | 13.79 | 13.79 |
| Total | 100.00 | 100.00 | 100.00 | 100.00 | 100.00 | 100.00 |
| $Al^{3+}/(Si^{4+} + Al^{3+})$ | 0.07 | 0.27 | 0.35 | 0.60 | 0.80 | 0.80 |
| MANUFACTURING OF GLASS GOB ($\phi$ 6) | DEVITRIFIED | DEVITRIFIED | DEVITRIFIED | VITRIFIED | VITRIFIED | VITRIFIED |
| $Tg(°\,C.)$ | — | — | — | 781 | 773 | 764 |
| $Tp(°\,C.)$ | — | — | — | 886 | 893 | 888 |
| $Tp - Tg\,(°\,C.)$ | — | — | — | 105 | 120 | 124 |
| $n_d$ | — | — | — | 2.03918 | 1.97576 | 1.98016 |
| $v_d$ | — | — | — | 22.9 | 27.2 | 27.2 |

As described above, it was confirmed that the optical glass in each example had a high refractive index, low dispersibility, and devitrification resistance at a high level, and a large glass gob could be stably manufactured.

What is claimed is:

1. An optical glass comprising:
by mol % of a cation,
5% to 20% of a content rate of $Si^{4+}$;
20.12% to 35% of a content rate of $Al^{3+}$;
15% to 50% of a total content rate of $La^{3+}$, $Y^{3+}$, and $Gd^{3+}$;
4.44% to 15% of a content rate of $Zr^{4+}$;
8% to 30% of a content rate of $Ta^{5+}$; and
0% to 10% of a content rate of $Gd^{3+}$,
wherein a ratio of the content rate of $Al^{3+}$ to a total content rate of $Si^{4+}$ and $Al^{3+}$ ($Al^{3+}/(Si^{4+}+Al^{3+})$) is from 0.5 to 0.85, and
an abbe number ($v_d$) is from 25 to 40.

2. The optical glass according to claim 1, wherein, by mol % of a cation,
a total content rate of $Mg^{2+}$, $Ca^{2+}$, $Sr^{2+}$, and $Ba^{2+}$ is from 0% to 15%.

3. The optical glass according to claim 1, wherein, by mol % of a cation,
a content rate of $Ti^{4+}$ is from 0% to 10%.

4. The optical glass according to claim 1, wherein, by mol % of a cation,
a content rate of $Nb^{5+}$ is from 0% to 30%.

5. The optical glass according to claim 1, wherein
$B^{3+}$ and $P^{5+}$ are not substantially contained.

6. The optical glass according to claim 1, wherein
$Li^+$, $Na^+$, $K^+$, and $Cs^+$ are not substantially contained.

7. The optical glass according to claim 1, wherein
a difference ($\Delta T$) expressed by a crystallization peak temperature ($T_p$)—a glass transition temperature ($T_g$) is equal to or more than 130 degrees Celsius.

8. The optical glass according to claim 1, wherein
a refractive index ($n_d$) with respect to a d-line is from 1.95 to 2.05.

9. The optical glass according to claim 1, wherein
a maximum value of a thickness is equal to or more than 6 mm.

10. An optical element formed of the optical glass according to claim 1.

11. An optical system using the optical element according to claim 10.

12. An interchangeable lens comprising the optical system according to claim 11.

13. An optical device comprising the optical system according to claim 11.

14. The optical glass according to claim 1, wherein, by mol % of a cation,
a content rate of $B^{3+}$ is from 0% to 3%.

15. The optical glass according to claim 1, wherein, by mol % of a cation,
a total content rate of $Li^+$, $Na^+$, $K^+$, and $Cs^+$ is from 0% to 3%.

16. The optical glass according to claim 1, wherein, by mol % of a cation,
a content rate of $Ta^{5+}$ is from 12.42% to 30%.

17. An optical glass comprising:
by mol % of a cation,
5% to 20% of a content rate of $Si^{4+}$;
20.12% to 35% of a content rate of $Al^{3+}$;
15% to 50% of a total content rate of $La^{3+}$, $Y^{3+}$, and $Gd^{3+}$;
4.44% to 15% of a content rate of $Zr^{4+}$;
8% to 30% of a content rate of $Ta^{5+}$; and
0% to 10% of a content rate of $Gd^{3+}$,
wherein a ratio of the content rate of $Al^{3+}$ to a total content rate of $Si^{4+}$ and $Al^{3+}$ ($Al^{3+}/(Si^{4+}+Al^{3+})$) is from 0.5 to 0.85, and
$B^{3+}$ is not substantially contained.

18. The optical glass according to claim 17, wherein, by mol % of a cation,
a total content rate of $Mg^{2+}$, $Ca^{2+}$, $Sr^{2+}$, and $Ba^{2+}$ is from 0% to 15%.

19. The optical glass according to claim 17, wherein, by mol % of a cation,
a content rate of $Ti^{4+}$ is from 0% to 10%.

20. The optical glass according to claim 17, wherein, by mol % of a cation,
a content rate of $Nb^{5+}$ is from 0% to 30%.

21. The optical glass according to claim 17, wherein
$B^{3+}$ and $P^{5+}$ are not substantially contained.

22. The optical glass according to claim 17, wherein
$Li^+$, $Na^+$, $K^+$, and $Cs^+$ are not substantially contained.

23. The optical glass according to claim 17, wherein, by mol % of a cation,
a total content rate of $Li^+$, $Na^+$, $K^+$, and $Cs^+$ is from 0% to 3%.

24. The optical glass according to claim 17, wherein, by mol % of a cation, a content rate of $Ta^{5+}$ is from 12.42% to 30%.

25. The optical glass according to claim 17, wherein an abbe number ($v_d$) is from 25 to 40.

26. An optical element formed of the optical glass according to claim 17.

27. An optical system using the optical element according to claim 26.

28. An interchangeable lens comprising the optical system according to claim 27.

29. An optical device comprising the optical system according to claim 27.

* * * * *